United States Patent
Mackin et al.

(10) Patent No.: US 12,187,441 B2
(45) Date of Patent: Jan. 7, 2025

(54) AIRCRAFT ENVIRONMENTAL CONTROL SYSTEMS HAVING ELECTRICALLY POWERED RAM CIRCUIT FANS

(71) Applicant: The Boeing Company, Arlington, VA (US)

(72) Inventors: Steve G. Mackin, Bellevue, WA (US); Douglas J. Silva, Auburn, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/574,297

(22) Filed: Jan. 12, 2022

(65) Prior Publication Data

US 2022/0340287 A1 Oct. 27, 2022

Related U.S. Application Data (60) Provisional application No. 63/180,459, filed on Apr. 27, 2021.

(51) Int. Cl.
*B64D 13/08* (2006.01)
*B64D 13/06* (2006.01)

(52) U.S. Cl.
CPC ...... *B64D 13/08* (2013.01); *B64D 2013/0614* (2013.01); *B64D 2013/0618* (2013.01); *B64D 2013/0644* (2013.01)

(58) Field of Classification Search
CPC ........ B64D 13/08; B64D 13/06; B64D 13/02; B64D 13/006; B64D 2013/0618; B64D 2013/0688; B64D 2013/0611; B64D 2013/064; B64D 2013/0644; B64D 2013/0655; B64D 2221/00; B64D 33/02; B64D 33/04; F02C 6/08
See application file for complete search history.

(56) References Cited

U.S. PATENT DOCUMENTS

| | | | | |
|---|---|---|---|---|
| 4,312,191 A | * | 1/1982 | Biagini | B64D 13/06 62/402 |
| 11,187,148 B1 | * | 11/2021 | MacDonald | F02C 6/06 |
| 2003/0019237 A1 | * | 1/2003 | Clarke | B64D 13/06 62/402 |

(Continued)

FOREIGN PATENT DOCUMENTS

| | | | | |
|---|---|---|---|---|
| EP | 2236419 A2 | * | 10/2010 | B64C 25/405 |
| WO | WO-2012092474 A1 | * | 7/2012 | B64D 35/00 |

*Primary Examiner* — Gordon A Jones
(74) *Attorney, Agent, or Firm* — HANLEY, FLIGHT & ZIMMERMAN, LLC (57) ABSTRACT

Aircraft environmental control systems having electrically powered ram circuit fans are described herein. An example environmental control system includes an air cycle machine to produce cabin air for a cabin of the aircraft. The air cycle machine includes a turbine and a heat exchanger. The environmental control system also includes a ram circuit. The heat exchanger is disposed in the ram circuit. The environmental control system further includes a fan in the ram circuit to control air flow through the ram circuit and across the heat exchanger, an electric motor, and an overrunning clutch operatively coupled between the turbine and the electric motor to enable the turbine to drive the fan during a first mode of operation and to enable the electric motor to drive the fan during a second mode of operation.

20 Claims, 7 Drawing Sheets

(56) References Cited

U.S. PATENT DOCUMENTS

| | | | |
|---|---|---|---|
| 2015/0275769 A1* | 10/2015 | Foutch | F02C 7/047 |
| | | | 60/776 |
| 2016/0097328 A1* | 4/2016 | Wintgens | F02C 7/32 |
| | | | 415/123 |
| 2016/0272329 A1* | 9/2016 | Beers | F25B 9/004 |
| 2017/0184022 A1* | 6/2017 | Stewart | B64D 27/12 |
| 2019/0322379 A1* | 10/2019 | Mackin | B64D 27/02 |
| 2021/0254545 A1* | 8/2021 | Ajami | B64D 13/06 |
| 2021/0371116 A1* | 12/2021 | Cartwright | B60L 50/60 |

* cited by examiner

AIRCRAFT ENVIRONMENTAL CONTROL SYSTEMS HAVING ELECTRICALLY POWERED RAM CIRCUIT FANS

RELATED APPLICATION

This patent claims the benefit under 35 U.S.C. § 119(e) to U.S. Provisional Application No. 63/180,459, titled "Aircraft Environmental Control Systems Having Electrically Powered Ram Circuit Fans," filed Apr. 27, 2021, which is hereby incorporated by this reference in its entirety.

FIELD OF THE DISCLOSURE

This disclosure relates generally to aircraft and, more particularly, to aircraft environmental control systems having electrically powered ram circuit fans.

BACKGROUND

Aircraft often include an environmental control system (ECS) the provides air at a desired temperature and/or pressure to a cabin of the aircraft. In known systems, the ECS receives high pressure bleed air from a compressor of an engine of the aircraft. The bleed air is routed through one or more heat exchangers and/or turbo-compressors to regulate the air to a desired temperature and/or pressure that is then provided as supply air to the cabin. The ECS includes a ram circuit that provides cooling to the heat exchangers. A fan is disposed in the ram circuit to produce enough mass air flow to properly cool the heat exchangers. The fan is coupled to and driven by the turbo-compressor of the ECS.

SUMMARY

An example environmental control system for an aircraft disclosed herein includes an air cycle machine to produce cabin air for a cabin of the aircraft. The air cycle machine includes a turbine and a heat exchanger. The environmental control system also includes a ram circuit. The heat exchanger is disposed in the ram circuit. The environmental control system further includes a fan in the ram circuit to control air flow through the ram circuit and across the heat exchanger, an electric motor, and an overrunning clutch operatively coupled between the turbine and the electric motor to enable the turbine to drive the fan during a first mode of operation and to enable the electric motor to drive the fan during a second mode of operation.

An example method disclosed herein includes operating an environmental control system (ECS) of an aircraft in a first mode of operation in which a turbine of an air cycle machine of the ECS drives a fan disposed in a ram circuit of the ECS, monitoring a parameter of the ECS, comparing the parameter to a threshold, and in response to determining the parameter does not satisfy the threshold, activating an electric motor to operate the ECS in a second mode of operation in which the electric motor drives the fan.

An example aircraft disclosed herein includes an electronics bay including electronic components and a supplementary cooling system to regulate a temperature of the electronics bay. The supplementary cooling system includes a heat exchanger. The aircraft also includes an environmental control system (ECS) including a ram circuit. The heat exchanger of the supplementary cooling system is disposed in the ram circuit.

BRIEF DESCRIPTION OF THE DRAWINGS

The figures are not to scale. In general, the same reference numbers will be used throughout the drawing(s) and accompanying written description to refer to the same or like parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Disclosed herein are example environmental control systems (ECSs) for aircraft. The example ECSs enable increased mass air flow through a ram circuit. As such, the ram circuit can be used for cooling heat exchangers of other cooling systems on the aircraft, such as cooling systems for electronic components or equipment. This results in power and specific-fuel-consumption (SFC) savings to the aircraft.

An example ECS disclosed herein includes an air cycle machine to produce pressurized and temperature regulated air for a cabin of the aircraft. The air cycle machine includes one or more turbines and one or more heat exchangers. The heat exchangers are disposed in a ram circuit that directs atmospheric air (which is relatively cold) across the heat exchangers. The ECS includes a fan that is disposed in the ram circuit. The fan operates to produce enough mass air flow through the ram circuit to sufficiently cool the air flowing through the heat exchangers.

In known ECSs, the fan is coupled directly to and driven by the turbines of the air cycle machine. However, this limits the cooling capacity of the ram circuit. In particular, it may be desirable to utilize the ECS ram circuit to cool fluid from one or more other cooling systems on the aircraft. For example, some aircraft include electronic components or equipment that generate(s) significant heat. These aircraft typically include a liquid or air cooling loop that utilizes a heat exchanger to reject the heat to the atmosphere. It may be desirable to install the heat exchanger of the cooling loop in the ram circuit rather than creating an additional ram circuit for the heat exchanger that adds significant weight and drag to the aircraft and decreases the aircraft specific fuel consumption (SFC). However, installing the heat exchanger of the cooling loop in the ECS ram circuit creates a larger pressure drop through the ram circuit. Known ram circuit configurations are not equipped and sized to handle the additional pressure drop and heat rejection of an additional heat exchanger. In particular, the turbine of the air cycle machine is not sized or designed to drive the fan at higher speeds to produce the higher mass air flow requirements to effectively cool all of the heat exchangers.

The example ECS disclosed herein includes an electric motor that can be used to drive the fan at higher speeds and/or high power to generate higher mass air flow through the ram circuit. The ECS can switch between a first mode of operation in which the turbine of the air cycle machine drives the fan and a second mode of operation in which the electric motor drives the fan. This enables the fan to be driven at a higher speeds/power and thereby increase the pressure and flow through the ram circuit. As such, the ram circuit can be utilized to meet the cooling demands (e.g., heat loads) of other systems without negatively affecting the ECS. For example, one or more additional heat exchangers from other cooling systems on the aircraft can be disposed in the ram circuit. When the cooling systems demand more cooling, the electric motor can be activated to drive the fan at a higher speed/power, thereby producing higher mass air flow through the ram circuit. This significantly increases the heat rejection capability of the ram circuit configuration. As such, the example ECS not only enables the ECS ram circuit to be used for cooling other heat exchangers, but also increases the efficiency of the air cycle machine for producing cabin air (because less load is placed on the air cycle machine for driving the fan, and higher mass air flow through the ram circuit improves heat transfer).

In some examples, the ECS includes an overrunning clutch (e.g., a sprag clutch) operatively coupled between the turbine of the air cycle machine and the electric motor. During the first mode of operation, the electric motor is off, and the overrunning clutch mechanically couples the turbine and the fan. As such, during the first mode of operation, the turbine of the air cycle machine drives the fan. During the second mode of operation, the electric motor is activated to drive the fan. The overrunning clutch decouples the fan and the turbine so that the fan can be driven independent of (faster than) the turbine. The overrunning clutch is advantageous because it operates in a passive manner and does not require activation. The ECS can be switched back-and-forth between the first and second modes of operation by activating and deactivating the electric motor (or increasing and decreasing the speed of the electric motor). In some examples, the ECS can be operated in a third mode of operation in which both the turbine of the air cycle machine and the electric motor drive the fan cooperatively. In particular, during the third mode of operation, the electric motor is powered to supplement the horsepower delivered to the fan by operating at the speed set by the turbine.

Also, by using the electric motor to drive the fan during certain times, the fan of the ECS system can be sized larger (e.g., have a larger diameter) than known fans. This increases the mass air flow capabilities of the ram circuit. In some examples, the ECS includes variable inlet guide vanes disposed upstream of the fan in the ram circuit for controlling the amount of air flow to the fan. The variable inlet guides vanes can increase or decrease the amount of air flow allowed to the fan, which increases or decreases the load required to drive the fan. When the ECS is operating in the first mode of operation, for example, the variable inlet guide vanes can be moved to reduce or restrict the amount of air flow to the fan, which reduces the load on the turbine of the air cycle machine to drive the fan. When the ECS is operating in the second mode of operation, for example, the variable inlet guide vanes can be moved to increase or allow more air flow to the fan to increase the mass air flow through the ram circuit.

Figure 1:
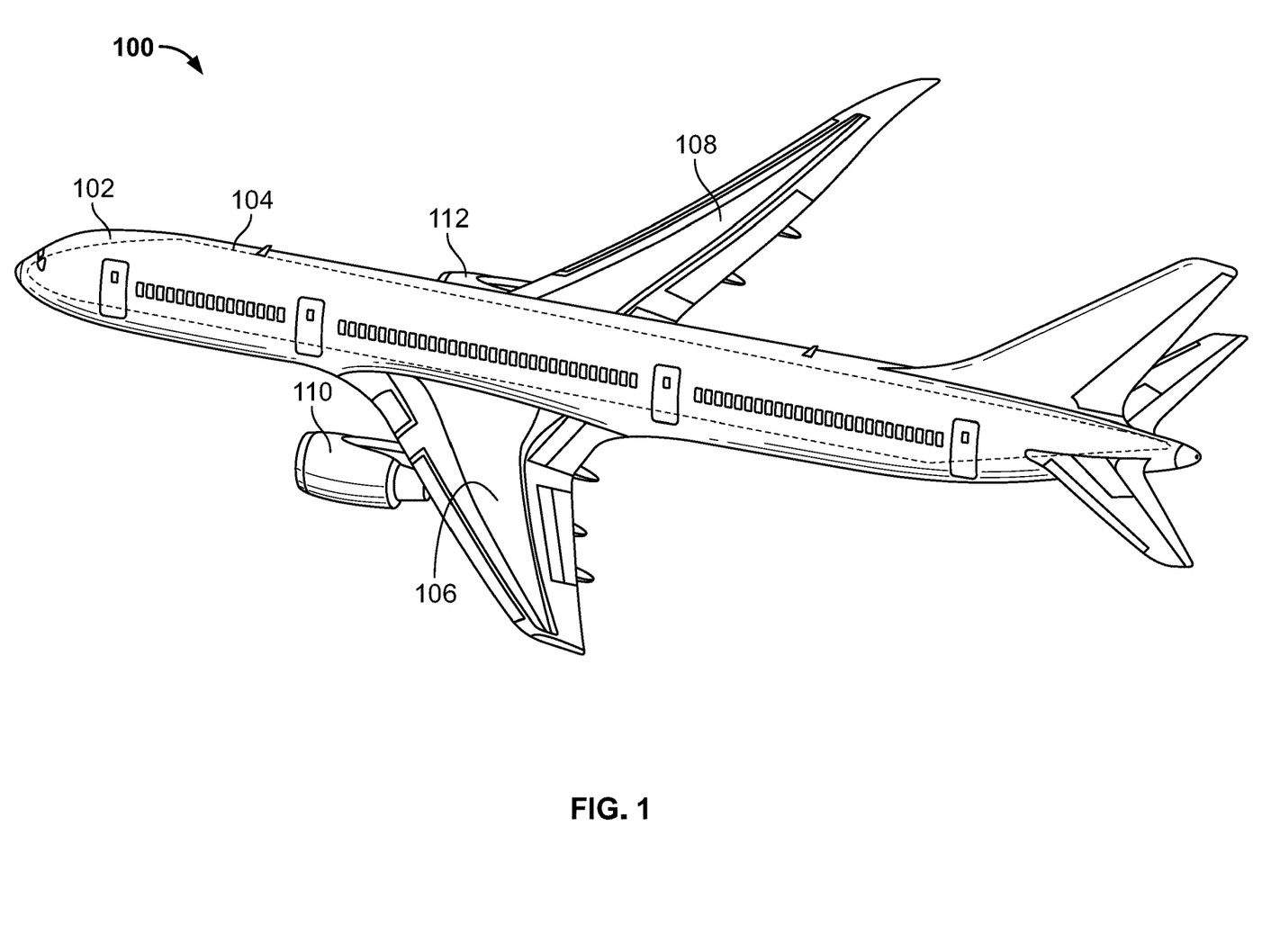
FIG. 1 illustrates an example aircraft in which the examples disclosed herein can be implemented.

FIG. 1 illustrates an example aircraft 100 in which the examples disclosed herein can be implemented. The aircraft 100 includes a fuselage 102, which defines a cabin 104, a first wing 106 coupled to the fuselage 102, and a second wing 108 coupled to the fuselage 102. In the illustrated example, the aircraft 100 includes a first engine 110 carried by the first wing 106 and a second engine 112 carried by the second wing 108. In other examples, the aircraft 100 may include only one engine or may include more than two engines. The engine(s) can be coupled to the first and/or second wings 106, 108 and/or another structure on the aircraft 100 (e.g., on the tail section of the fuselage 102).

Figure 2:
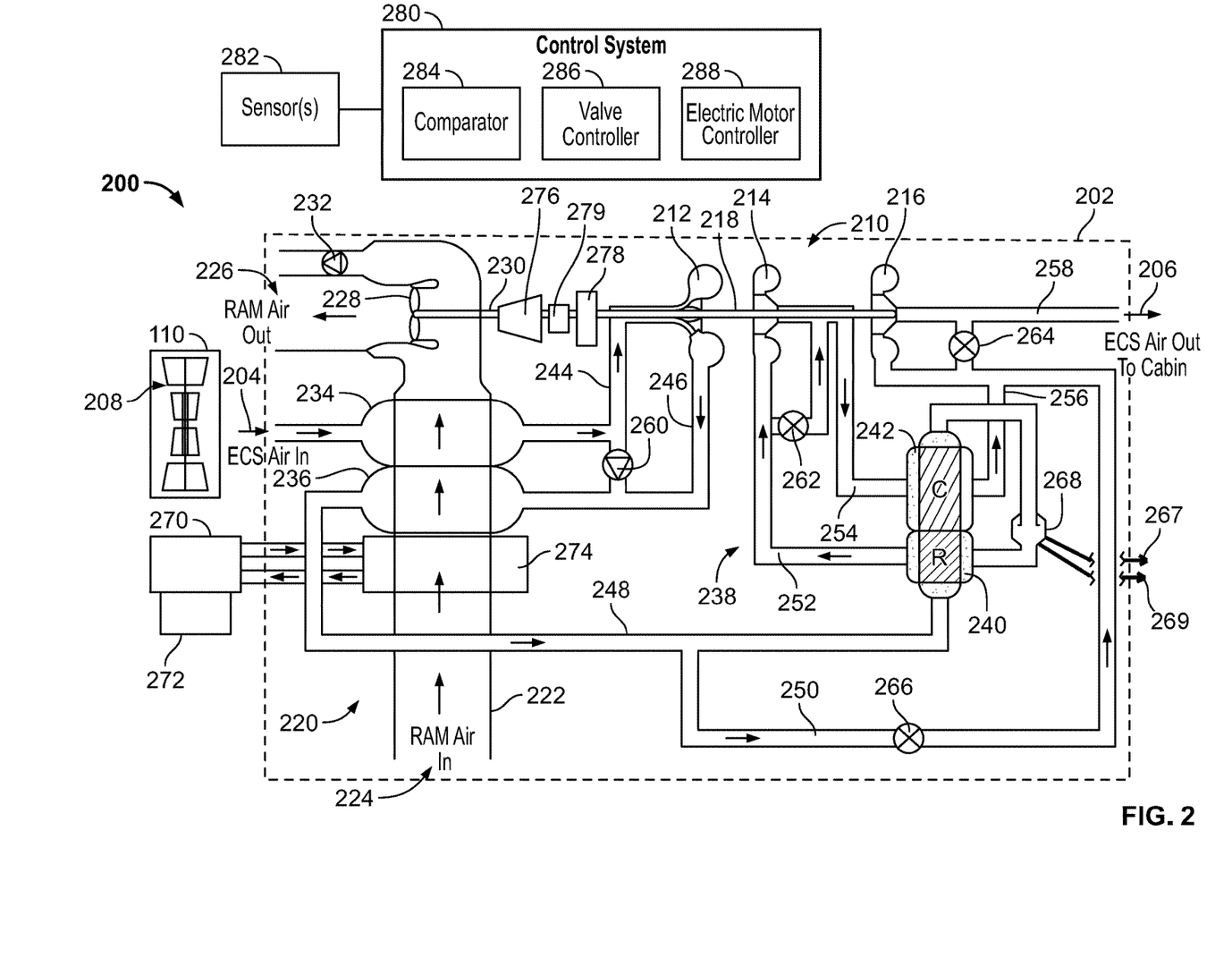
FIG. 2 is a schematic illustration of an example environmental control system that can be implemented in the example aircraft of FIG. 1 to produce cabin air and electronic cooling source for the example aircraft.

FIG. 2 is a schematic illustration of an example environmental control system (ECS) 200 constructed in accordance with the teachings of this disclosure. The ECS 200 may also be referred to as a cooling system, a hybrid cooling system, or air conditioning pack. The ECS 200 is configured to provide air for the cabin 104 (FIG. 1) of the aircraft 100 (FIG. 1). In particular, the air provided by the ECS 200 is used to pressurize the cabin 104 as well as provide cooler air for regulating the temperature of the air in the cabin 104 to a comfortable setting.

In the illustrated example, the ECS 200 includes an air cycle machine 202 (shown in dashed lines, but may not include the ram circuit 220 disclosed in further detail herein). The air cycle machine 202 receives inlet air 204, which is highly pressurized air from a pressurized air source. The air cycle machine 202 conditions/regulates the inlet air 204 to produce outlet air 206 (e.g., cabin air), which is air at a desired temperature and/or pressure that is provided to the cabin 104 (FIG. 1). In some examples, the inlet air 204 is bleed air from a compressor 208 (e.g., a high-pressure compressor, a low-pressure compressor) of the first engine 110. A block diagram representing the first engine 110 is shown in FIG. 2. In some examples, a valve is disposed between the compressor 208 and the ECS 200 to regulate the pressure of the inlet air 204 supplied to the ECS 200 (e.g., to a pressure of 45 pounds-per-square-inch (PSI)). Additionally or alternatively, the inlet air 204 can include bleed air from the second engine 112 (FIG. 1). In other examples, the inlet air 204 can include air another high pressure air source, such as fan air from a bypass duct of the first engine 110 and/or the second engine 112.

In the illustrated example, the air cycle machine 202 includes a compressor 212, a first turbine 214, and a second turbine 216. The compressor 212, the first turbine 214, and the second turbine 216 are coupled by a first drive shaft 218, thereby forming a turbo-compressor 210 (sometimes referred to as turbo-machinery). In other words, the first and second turbines 214, 216 are coupled to and drive the first drive shaft 218, which drives the compressor 212. As disclosed in further detail below, the turbo-compressor 210 is used to regulate the temperature and pressure of the inlet air 204 to produce the outlet air 206. While in this example the air cycle machine 202 includes two turbines, in other examples, the air cycle machine 202 may only include one turbine (e.g., only the second turbine 216) or more than two turbines. Further, while in this example the air cycle machine 202 includes the compressor 212, in other examples the air cycle machine 202 may not include a compressor.

In the illustrated example, the ECS 200 includes a ram circuit 220 (sometimes referred to as a ram air circuit) to direct air across one or more heat exchangers of the air cycle machine 202 and effectively draw heat away from the heat exchanger(s). The ram circuit 220 includes a passageway 222 between an inlet 224 and an outlet 226. The inlet 224 and the outlet 226 are openings on the outside of the aircraft 100. This allows atmospheric air to flow through the ram circuit 220. The atmospheric air at high altitudes is relatively low. As such, the ram circuit 220 directs cold atmospheric air through the passageway 222 to cool or reduce the temperature of the fluid in the one or more heat exchangers.

In the illustrated example, the ECS 200 includes a fan 228 disposed in the ram circuit 220 to control air flow through the ram circuit 220 and across one or more heat exchangers (e.g., heat exchangers 234, 236). In particular, the fan 228 operates to help move air through the ram circuit 220 and ensure enough mass air flow is provided to properly cool the heat exchanger(s). In the illustrated example, the ECS 200 includes a second drive shaft 230 that is coupled to and drives the fan 228. In some examples, the fan 228 is driven by the turbine(s) 214, 216 of the air cycle machine 202 (e.g., by connecting the first drive shaft 218 and the second drive shaft 230). However, in other examples, the fan 228 can be decoupled from the turbine(s) 214, 216 of the air cycle machine 202 and driven by another power source, as disclosed in further detail herein. In the illustrated example, a fan bypass check valve 232 is disposed in the ram circuit 220. The fan bypass check valve 232 can be opened to enable air to flow around the fan 228, such as if high air flow is already present in the ram circuit 220.

In the illustrated example, the air cycle machine 202 includes a heat exchanger 234 (referred to herein as a primary heat exchanger 234 but may also be referred to as a first heat exchanger 234, a second heat exchanger 234, etc.), a heat exchanger 236 (referred to herein as a secondary heat exchanger 236 but may also be referred to as a first heat exchanger 236, a second heat exchanger 236, etc.), and a reheat circuit 238 including a reheater 240 and a condenser 242. The example air cycle machine 202 also includes a plurality of passageways between the different components. In particular, the air cycle machine 202 includes a first passageway 244 fluidly coupled between the primary heat exchanger 234 and an inlet of compressor 212, a second passageway 246 fluidly coupled between an outlet of the compressor 212 and the secondary heat exchanger 236, a third passageway 248 fluidly coupled between the secondary heat exchanger 236 and the reheater 240, a fourth passageway 250 fluidly coupled between the third passageway 248 and an inlet of the second turbine 216, a fifth passageway 252 fluidly coupled between the reheater 240 and an inlet of the first turbine 214, a sixth passageway 254 between and an outlet of the turbine 214 and the condenser 242, a seventh passageway 256 fluidly coupled between the condenser 242 and the fourth passageway 250, and an eighth passageway 258 that directs the outlet air 206 from the outlet of the second turbine 216 to a downstream location, such as the cabin 104 (FIG. 1) of the aircraft 100 (FIG. 1).

An example of the air flow process through the air cycle machine 202 is disclosed below. The inlet air 204 (e.g., high pressure/temperature bleed air) flows through the primary heat exchanger 234. The primary heat exchanger 234 is disposed in the ram circuit 220. As such, the air (e.g., cold atmospheric air) flowing through the ram circuit 220 cools the inlet air 204 flowing through the primary heat exchanger 234. For example, the primary heat exchanger 234 may cool the inlet air 204 from 380° F. down to 250° F. The air exiting the primary heat exchanger 234 flows through the first passageway 244 to the compressor 212. The compressor 212 is driven by the first and/or second turbines 214, 216. The compressor 212 increases the pressure of the air and also slightly increases the temperature of the air. This increases the total mass air flow through the air cycle machine 202. The air exiting the compressor 212 flows through the second passageway 246 to the secondary heat exchanger 236. The secondary heat exchanger 236 is disposed in the ram circuit 220 (e.g., upstream of the primary heat exchanger 234). As such, the air (e.g., cold atmospheric air) flowing through the ram circuit 220 cools the air flowing through the secondary heat exchanger 236. In some examples, a first check valve 260 is disposed between the first and second passageways 244, 246. The first check valve 260 enables higher pressure air in the first passageway 244 to bypass the compressor 212. While in this example the air cycle machine 202 includes two heat exchangers, in other examples, the air cycle machine 202 may include only one heat exchanger (e.g., only the primary heat exchanger 234) or may include more than two heat exchangers.

The air exiting the secondary heat exchanger 236 flows through the third passageway 248 to the reheater 240, which increases the temperature of the air going to the first turbine 214 through the fifth passageway 252 and reduces the hot stream temperature entering the condenser 242. The hot stream temperature is further reduced by the turbine outlet flow, the sixth passageway 254, that is passing through the condenser 242. The water vapor in the hot stream condenses out and flows through the water extractor 268 where it is removed. The water removed at the water extractor 268 can be directed to a spray nozzle 267 in the ram circuit 220 to provide an evaporative cooling source to improve performance and/or to a drain 269. The air flows through the fifth passageway 252 to the first turbine 214. The air flows through the first turbine 214, which reduces the temperature and pressure of the air, and which powers the first turbine 214 (for driving the compressor 212). The air exiting the first turbine 214 flows through the sixth passageway 254 to the condenser 242, which condenses any moisture or water in the hot airstream passing through the reheater 240. In some examples, the air cycle machine 202 includes a first turbine bypass valve 262 coupled between the fifth passageway 252 and the sixth passageway 254 to enable at least some of the air to bypass the first turbine 214. The air exiting the condenser 242 flows through the seventh passageway 256 to the fourth passageway 250 and to the second turbine 216. The air flows through the second turbine 216, which further reduces the temperature and pressure of the air, and powers the second turbine 216 (for driving the compressor 212). The air exiting the second turbine 216 is directed by the eighth passageway 258 to a downstream area, such as the cabin 104 of the aircraft. In some examples, one or more valves and/or regulators can be disposed downstream of the second turbine 216 to regulate the final air temperature and pressure provide to the cabin 104. In some examples, the air cycle machine 202 includes a second turbine bypass valve 264 coupled between the fourth passageway 250 and the eighth passageway 258 to enable at least some of the air to bypass the second turbine 216.

In some examples, the air exiting the secondary heat exchanger 236 can bypass the reheat circuit 238. For example, a valve 266 is coupled to the fourth passageway 250. The valve 266 can be opened to enable at least some of the air in the third passageway 248 to flow directly to the second turbine 216, thereby bypassing the reheat circuit 238. In some examples, liquid moisture from the condenser 242 is collected in a water collector 268.

In known ECSs, the first drive shaft 218 of the turbo-compressor 210 is fixedly coupled to the fan 228 in the ram circuit 220. As such, the fan 228 is powered only by the first and second turbines 214, 216. However, the first and second turbines 214, 216 may not be sized or powered correctly to operate the fan 228 for higher mass air flow demands. For example, it may be desired to utilize the ram circuit 220 to cool one or more other heat exchangers of other cooling systems. However, this requires higher mass air flow through the ram circuit 220 because of the increased heat load caused by the additional heat exchangers.

For example, as shown in FIG. 2, the aircraft 100 includes a supplementary cooling system 270 (which may be referred to as cooling loop) to regulate a temperature of an electronics bay 272. The electronics bay 272 includes or represents any number of electronic components, such as servers, processors (e.g., CPUs, GPUs, etc.), navigation equipment, cameras, etc. that may be onboard the aircraft 100. These electronic components often generate significant heat and should be kept cool to operate properly. The cooling system 270 is used to keep the electronics bay within a desired temperature range for effective operation of the electronic components. As shown in FIG. 2, the cooling system 270 includes a heat exchanger 274 that is disposed in the ram circuit 220 of the ECS 200. The heat exchanger 274 may also be referred to as a first heat exchanger 274, a second heat exchanger 274, etc. The air (e.g., cold atmospheric air) flowing through the ram circuit 220 draws heat away from the heat exchanger 274, thereby enabling the cooling system to effectively regulate the temperature of the electronics bay 272. In this example, the heat exchanger 274 is upstream of the primary and secondary heat exchangers 234, 236 of the air cycle machine 202. However, in other examples, the heat exchanger 274 can be disposed downstream of the primary and secondary heat exchangers 234, 236 or between the primary and secondary heat exchangers 234, 236. The cooling system 270 may be a liquid-cooled or air-cooled system. Therefore, the heat exchanger 274 can be a liquid-to-air heat exchanger or an air-to-air heat exchanger.

Additionally or alternatively, one or more other components can be disposed in the ram circuit 220 for heat transfer. For example, one or more heat exchangers and/or vapor cycle chilling units for other cooling systems of the aircraft 100 (e.g., a cooling system for a refrigeration unit on the aircraft 100, a cooling system for medical supplies on the aircraft 100, etc.) can be disposed in the ram circuit 220.

To enable the fan 228 to operate at higher speeds or higher power, the example ECS 200 includes an electric motor 276. The electric motor 276 can be a variable speed electric motor. The electric motor 276 can be activated to drive the fan 228 during certain modes of operation in which high mass air flow is desired. In the illustrated example, the electric motor 276 is coupled to the second drive shaft 230. In some examples, the second drive shaft 230 extends through the electric motor 276 and is integrated with or otherwise coupled to the rotor of the electric motor 276. In other examples, the electric motor 276 can be installed in a hub of the fan 228 or in a fan tip. In the illustrated example, the ECS 200 includes an overrunning clutch 278. In some examples, the overrunning clutch 278 is a sprag clutch. The overrunning clutch 278 is coupled between the first drive shaft 218 and the second drive shaft 230. As such, the overrunning clutch 278 is operatively coupled between the turbines 214, 216 and the electric motor 276. The overrunning clutch 278 enables the first and/or second turbines 214, 216 to power or drive the fan 228 during a first mode of operation, and also enables the electric motor 276 to power or drive the fan 228 during a second mode of operation. For example, during take-off and/or cruise, the inlet air 204 provided to the air cycle machine 202 may have a relatively high pressure, which provides higher power to the turbines 214, 216 for driving the fan 228 at relatively high speeds to meet the mass air flow demands through the ram circuit 220 for sufficiently cooling the heat exchangers 234, 236, 274. This may be referred to as the first mode of operation. However, during descent or while the aircraft 100 is on the ground, the turbines 214, 216 may be operating at a slower speed that does not generate enough power to drive the fan 228 to meet the mass air flow demands for sufficiently cooling the heat exchangers 234, 236, 274. Therefore, the ECS 200 can switch to the second mode of operation. In the second mode of operation, the electric motor 276 is activated to power the fan 228 at a higher speed, thereby increasing the mass air flow through the ram circuit 220 to meet the mass air flow demands.

Figure 3A:
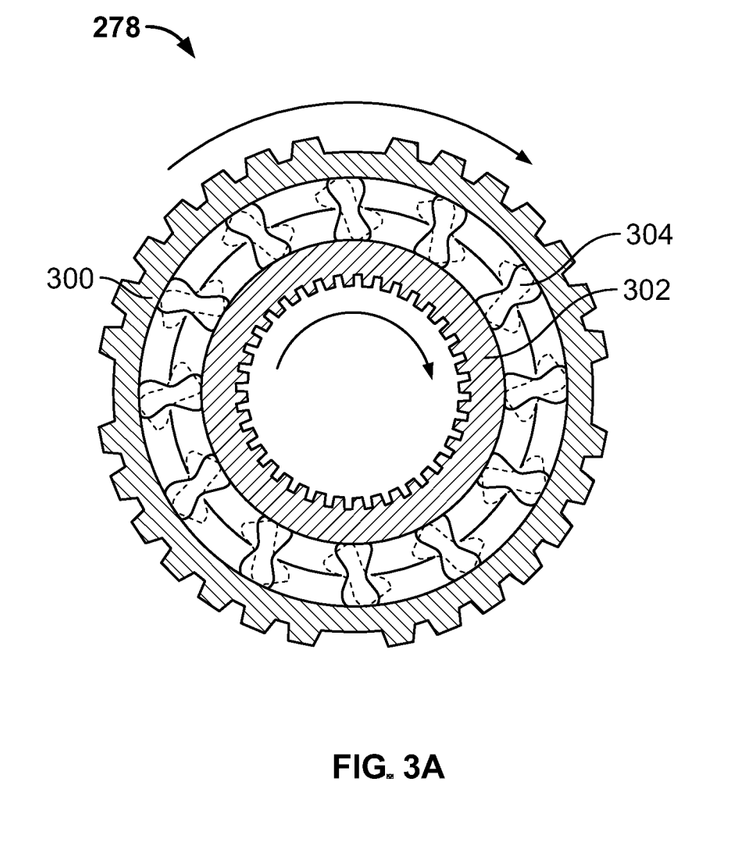
FIGS. 3A and 3B are cross-sectional views of an example sprag clutch that may be implemented in the example environmental control system of FIG. 2.
Figure 3B:
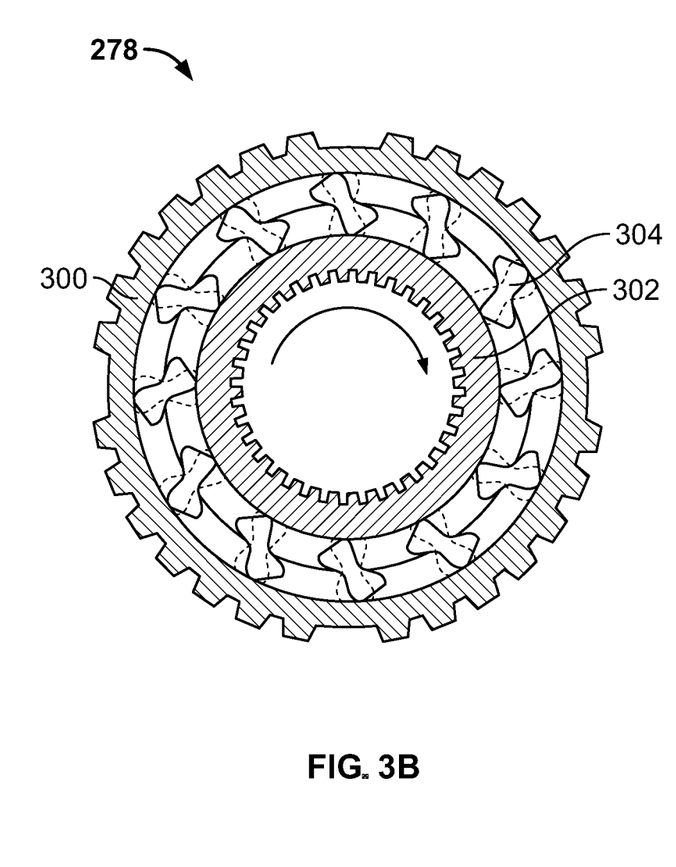

FIGS. 3A and 3B illustrate the overrunning clutch 278. In this example, the overrunning clutch 278 is implemented as a sprag clutch. The overrunning clutch 278 includes an outer race 300, an inner race 302, and a plurality of movable sprags 304 (one of which is referenced in FIGS. 3A and 3B) disposed between the outer race 300 and the inner race 302. In this example, the first drive shaft 218 (which is powered by the turbines 214, 216 of the turbo-compressor 210) is coupled to the outer race 300, and the second drive shaft 230 (which is coupled to the fan 228 and the electric motor 276) is coupled to the inner race 302. The sprags 304 are pivotable about their centers (extending into the page). FIG. 3A shows the overrunning clutch 278 in the engaged or locked state. In FIG. 3A, the outer race 300 is rotating in the clockwise direction. This occurs, for example, during the first mode of operation when the turbines 214, 216 are operating at a high enough speed to drive the fan 228 to meet the mass air flow demands through the ram circuit 220. The interaction between the outer race 300 and the sprags 304 causes the sprags 304 to pivot into and engage the inner race 302. As a result, the outer race 300, the sprags 304, and the inner race 302 all rotate together (in the clockwise direction in FIG. 3A). Therefore, when the first drive shaft 218 rotates the outer race 300, the outer race 300 rotates the inner race 302 and, thus, rotates the second drive shaft 230 in the same direction. Thus, the turbines 214, 216 drive the fan 228 in the first mode of operation.

FIG. 3B shows the overrunning clutch 278 in the disengaged or overriding state. In FIG. 3B, the inner race 302 is rotating in the clockwise direction independent of (faster than) the outer race 300. This occurs, for example, during the second mode of operation when the electric motor 276 is activated and drives the second drive shaft 230. As shown in FIG. 3B, the inner race 302 slides along the inner surfaces of the sprags 304. However, this interaction does not cause the sprags 304 to frictionally engage the outer race 300. As such, the inner race 302 rotates in the clockwise direction without causing rotation of the outer race 300. If the outer race 300 is rotated up to a speed that matches the rotational speed of the inner race 302, the sprags 304 are pivoted into the inner race 302 and the outer race 300 eventually overdrives the inner race 302. As such, the inner race 302 rotates at least as fast as the outer race 300. Conversely, while the outer race 300 is rotating, the inner race 302 can rotate independently at a faster rotational speed than the outer race 300, which does not affect the outer race 300. Therefore, during the first mode of operation, the overrunning clutch 278 couples the first drive shaft 218 (FIG. 2) and the second drive shaft 230 (FIG. 2) to enable the turbines 214, 216 to drive the fan 228, and during the second mode of operation, the overrunning clutch 278 decouples the first drive shaft 218 and the second drive shaft 230 to enable the electric motor 276 to drive the second drive shaft 230 independent of the first drive shaft 218.

Referring back to FIG. 2, the overrunning clutch 278 advantageously enables turbo-compressor 210 to drive the fan 228 during the first mode of operation, and also enables the electric motor 276 to drive the fan 228 during the second mode of operation without driving the turbo-compressor 210. This type of overrunning clutch also advantageously operates without requiring any power or actuating mechanisms. While in this example the overrunning clutch 278 is implemented as a sprag clutch, in other examples, the overrunning clutch 278 can be implemented by another type of clutch, such as a free-wheel, a no-back clutch, a one-way roller clutch, etc. Further, in other examples, rather than using a passive overrunning clutch, the ECS 200 could include an activate clutch operated by an actuator to couple and decouple the first and second drive shafts 218, 230.

In some examples, the ECS 200 can operate in a third mode of operation, in which both the air cycle machine 202 and the electric motor 276 drive the fan 228 cooperatively. For example, the electric motor 276 can be activated to drive the second drive shaft 230 at relatively the same speed as the first drive shaft 218. As a result, the overrunning clutch 278 couples the first and second drive shafts 218, 230. This enables the electric motor 276 to supplement the power provided to the fan 228 and reduces some of the load on the turbines 214, 216.

In some examples, as illustrated in FIG. 2, the ECS 200 includes an air bearing 279 to support the second drive shaft 230 and enable the second drive shaft 230 to rotate smoothly. In some examples, the air bearing 279 is provided with pressurized air from the compressor 212. In other examples, the air bearing 279 can be provided with pressurized air from other sources. While in this example the air bearing 279 is disposed between the electric motor 276 and the overrunning clutch 278, in other examples, the air bearing 279 can be disposed in other locations. Further, in other examples, one or more additional air bearings can be used to support the second drive shaft 230.

In the illustrated example of FIG. 2, the example ECS 200 includes a control system 280 to operate the various devices and control the operation of the ECS 200. The control system 280 can be implemented by a controller or processor, such as the processor 712 of the processor platform 700 disclosed in connection with FIG. 7. The control system 280 is communicatively coupled to one or more sensors 282, the valves 260, 262, 264, 266, the cooling system 270, the electric motor 276, and/or any other device that controls and/or monitors various parameters of the ECS 200.

The sensor(s) 282 can include any number and/or type of sensors to measure one or more parameters (e.g., temperature, pressure, drive shaft speed, etc.) of the air throughout the ECS 200 and/or components of the ECS 200. The sensor(s) 282 can include temperature sensors, pressure sensors, flow sensors, humidity sensors, speed sensors, etc. to measure the temperature, pressure, flow rate, water content, and/or any other parameters of the cabin supply air and cabin exhaust air at various points in the ECS 200 and/or components of the ECS 200. For example, one or more of the sensor(s) 282 can be coupled to or disposed in the ram circuit 220 (e.g., upstream and/or downstream of the heat exchangers 234, 236, 274), the heat exchangers 234, 236, 274, the passageways 244, 246, 248, 250, 252, 254, 256, 258, etc. to measure the temperature, pressure, mass flow rate, water content, etc. of the air in the various sections. Further, the sensor(s) 282 can include speed sensors (e.g., tachometers) to measure the speed of the first engine 110, the speed of the electric motor 276, etc. Additional sensors may be provided in various other locations to similarly measure one or more parameters of the air at various points in the ECS 200.

In the illustrated example, the control system 280 includes a comparator 284, a valve controller 286, and an electric motor controller 288. The comparator 284 compares the measured values of the parameter(s) from the sensor(s) 282 to one or more thresholds or threshold ranges. Based on whether the parameter(s) satisfy the thresholds or threshold ranges, the controllers 286, 288 can operate one or more of the devices to result in optimal cabin supply air pressure and temperature. For example, the valve controller 286 controls the states of the valves 260, 262, 264, 266. For instance, any of the valves 260, 262, 264, 266 can be operated between an open state and a closed state and any state therebetween (e.g., half open) to control the flow of fluid through the respective passageways. Further, while only four valves are illustrated in FIG. 2, one or more additional valves can be incorporated in other ones of the passageways.

The electric motor controller 288 controls the electric motor 276. In particular, the electric motor controller 288 can activate the electric motor 276, de-activate the electric motor 276, and control the speed of the electric motor 276. In some examples, the electric motor controller 288 determines when to activate the electric motor 276 and/or change the speed of the electric motor 276 based on the cooling demands of the ECS 200. For example, if the cooling system 270 is on and demands more cooling from the ram circuit 220, the electric motor controller 288 can activate the electric motor 276 or increase the speed of the electric motor 276 (if the electric motor 276 was already activated) to drive the fan 228 (in the second mode of operation). For example, the electric motor controller 288 can control the electric motor 276 based on a heat load from the cooling system 270. The heat load can represent the amount of cooling demand for the electronics bay 272. The head load can be provided by the sensor(s) 282 and/or by a signal from the cooling system 270. If the cooling system 270 is off or the heat load is low, the ECS 200 may continue to operate in the first mode of operation where the turbo-compressor 210 drives the fan 228. However, if the cooling system 270 is activated and/or the heat load is increased (e.g., above a threshold value), the electric motor controller 288 can activate the electric motor 276 to drive the fan 228 in the second mode of operation, thereby ensuring sufficient mass air flow is provided through the ram circuit 220. Therefore, the example ECS 200 can provide sufficient mass air flow to support one or more additional heat exchangers of an air vehicle cooling system, such as the heat exchanger 274 of the cooling system 270.

Additionally or alternative, the comparator 284 can monitor one or more other parameter(s) and compare the parameter(s) to their respective thresholds or threshold ranges. If the one or more parameter(s) do not satisfy their thresholds or threshold ranges, this may indicate the ECS 200 demands more cooling. For example, the comparator 284 may monitor the pressure, temperature, mass air flow, etc. through various parts of the ECS 200. If the comparator 284 determines the parameters are not meeting their respective thresholds (e.g., because the cooling in the first mode of operation is insufficient), the electric motor controller 288 can activate the electric motor 276 or increase the speed of the electric motor 276 (if the electric motor 276 was already activated) to drive the fan 228 (in the second mode of operation). If the cooling demand is reduced, the electric motor controller 288 can deactivate the electric motor 276 or decrease the speed of the electric motor 276 such that the overrunning clutch 278 re-engages and allows the turbines 214, 216 to drive the fan 228. The ECS 200 can switch back-and-forth between the first and second modes of operation based on the cooling demands of the system.

Figure 4:
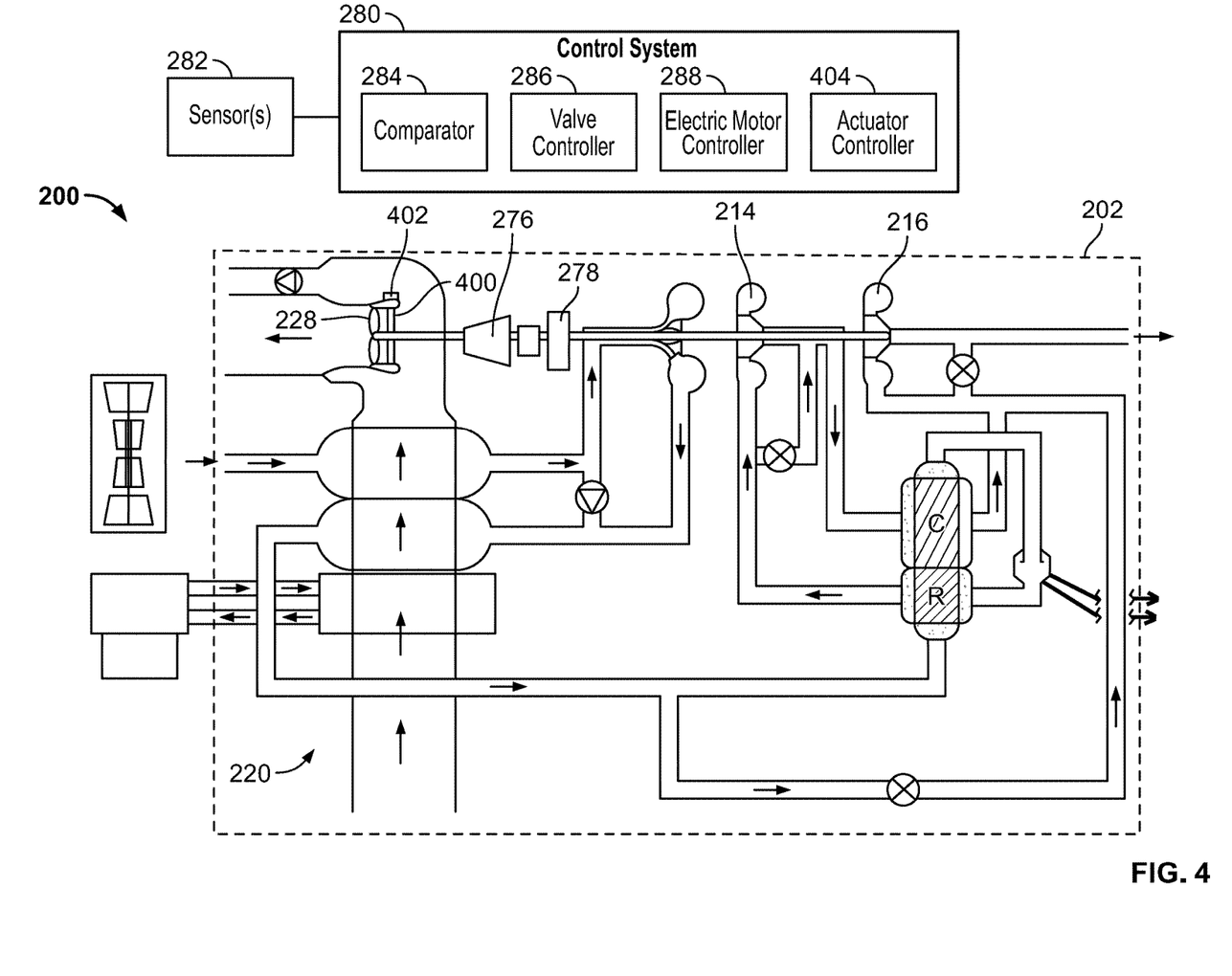
FIG. 4 shows the example environmental control system of FIG. 2 with example variable inlet guide vanes.

FIG. 4 illustrates an example in which the example ECS 200 of FIG. 2 includes variable inlet guide vanes 400. As disclosed above, the fan 228 can be decoupled from the air cycle machine 202 (e.g., from the turbines 214, 216) and instead be driven by the electric motor 276. As such, the fan 228 can be sized larger than traditional fans, because the electric motor 276 can provide sufficient power for driving larger fans. However, when the ECS 200 is operating in the first mode of operation where the turbines 214, 216 are driving the fan 228 (e.g., during lower cooling demands times), the turbines 214, 216 may not produce enough power to drive the larger sized fan 228. Therefore, in some examples, the ECS 200 can include the variable inlet guide vanes 400. The variable inlet guide vanes 400 are disposed in the ram circuit 220 upstream of the fan 228. The ECS 200 includes an actuator 402 that can be activated to move the variable inlet guide vanes 400 to increase or decrease air flow to the fan 228. This essentially increases or decreases the size of the required horsepower needed by the fan 228. During the first mode of operation, the actuator 402 can move the variable inlet guide vanes 400 to reduce or restrict air flow to the fan 228, thereby reducing the power needed to drive the fan 228, which enables the turbo-compressor 210 to sufficiently power the fan 228. During the second mode of operation where the electric motor 276 is driving the fan 228, the actuator 402 can move the variable inlet guide vanes 400 to allow more air to the fan 228 to increase mass air flow through the ram circuit 220. In the illustrated example, the control system 280 includes an actuator control 404 for activating and controller the actuator 402. The actuator controller 404 can control the actuator 402 based on one or more parameters.

Figure 5:
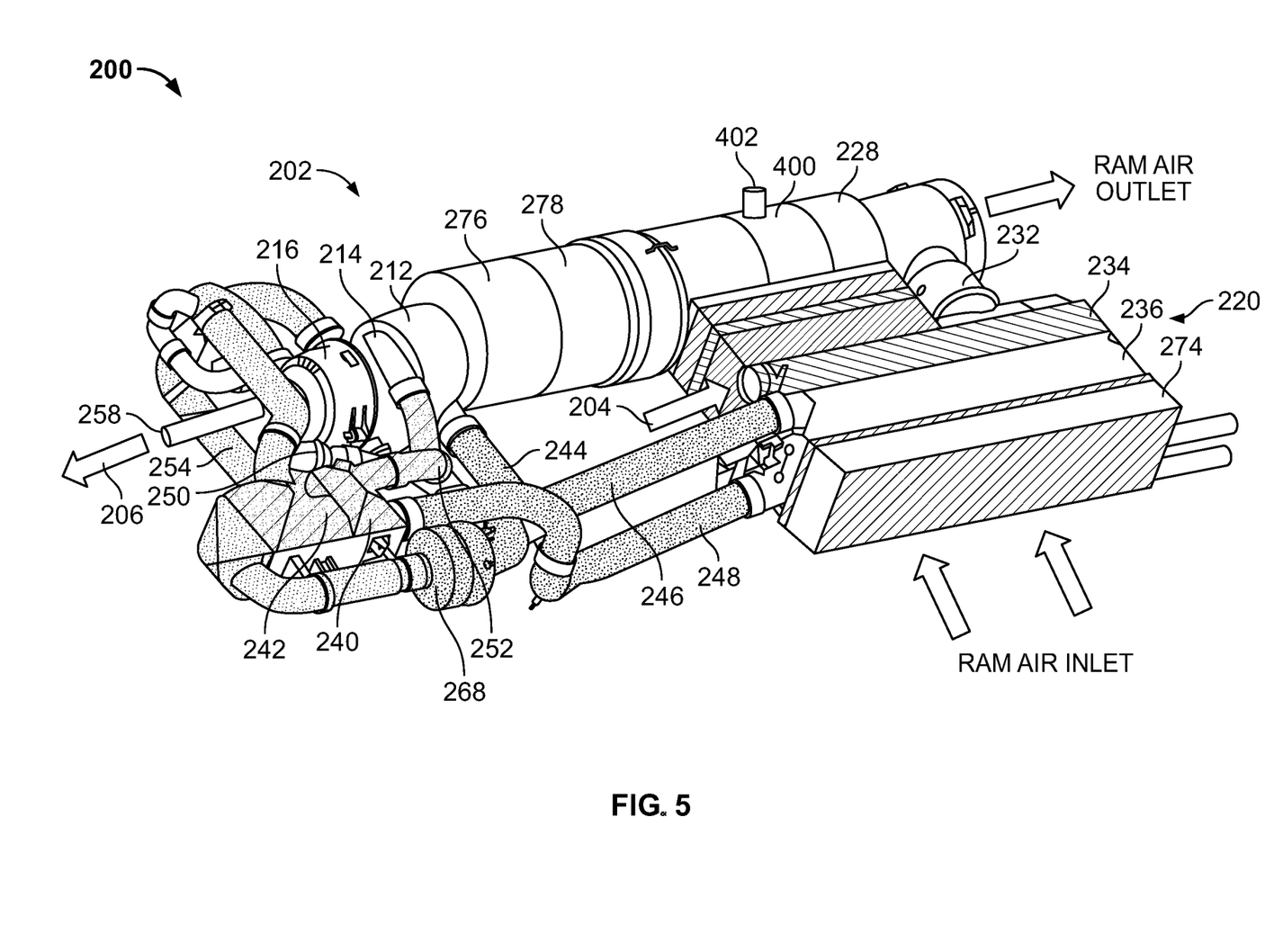
FIG. 5 shows an example physical implementation of the example environmental control system of FIGS. 2 and 4.

FIG. 5 illustrates an example physical implementation of the example ECS 200 and the example air cycle machine 202 of FIG. 2. The following components are labeled in FIG. 5: the compressor 212, the first turbine 214, the second turbine 216, the fan 228, the primary heat exchanger 234, the secondary heat exchanger 236, the reheater 240, the condenser 242, the first passageway 244, the second passageway 246, the third passageway 248, the fourth passageway 250, the fifth passageway 252, the sixth passageway 254, the eighth passageway 258, the water collector 268, the heat exchanger 274 for the cooling system 270 (FIG. 2), the electric motor 276, the overrunning clutch 278, the variable inlet guide vanes 400, and the actuator 402 for the variable inlet guide vanes 400.

As shown in FIG. 5, the inlet air 204 (e.g., bleed air) enters the primary heat exchanger 234, and the outlet air 206 (the conditioned air) exits the eighth passageway 258 from the second turbine 216. The ram circuit 220 directs ram inlet air (shown by the arrows) through the heat exchangers 274, 236, 234, through the variable inlet guide vanes 400, through the fan 228, and then out to the atmosphere. In some examples, modulated inlet doors on the inlet 224 (FIG. 2) and/or the exhaust outlet 226 (FIG. 2) can be utilized to control ram flow throughput. The fan 228 can control the mass air flow through the ram circuit 220. As disclosed above, the overrunning clutch 278 enables the fan 228 to be operatively coupled to and driven by the turbines 214, 216 during the first mode of operation, and enables the fan 228 to be decoupled from the turbines 214, 216 and driven by the electric motor 276 during the second mode of operation. The actuator 402 can move the variable inlet guide vanes 400 to increase or decrease mass air flow through the fan 228, thereby affecting the load on the turbines 214, 216 and/or the electric motor 276. In some examples, the fan bypass check valve 232 can be opened to enable the ram air to bypass the fan 228.

While an example manner of control system 280 is illustrated in FIGS. 2 and 4, one or more of the elements, processes and/or devices illustrated in FIG. 2 may be combined, divided, re-arranged, omitted, eliminated and/or implemented in any other way. Further, the comparator 284, the valve controller 286, the electric motor controller 288, the actuator controller 404 and/or, more generally, the example control system 280 of FIGS. 2 and 4 may be implemented by hardware, software, firmware and/or any combination of hardware, software and/or firmware. Thus, for example, any of the example comparator 284, the valve controller 286, the electric motor controller 288, the actuator controller 404 and/or, more generally, the example control system 280 of FIGS. 2 and 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example comparator 284, the valve controller 286, the electric motor controller 288, and/or the actuator controller 404 is/are hereby expressly defined to include a non-transitory computer readable storage device or storage disk such as a memory, a digital versatile disk (DVD), a compact disk (CD), a Blu-ray disk, etc. including the software and/or firmware. Further still, the example control system 280 of FIGS. 2 and 4 may include one or more elements, processes and/or devices in addition to, or instead of, those illustrated in FIGS. 2 and 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
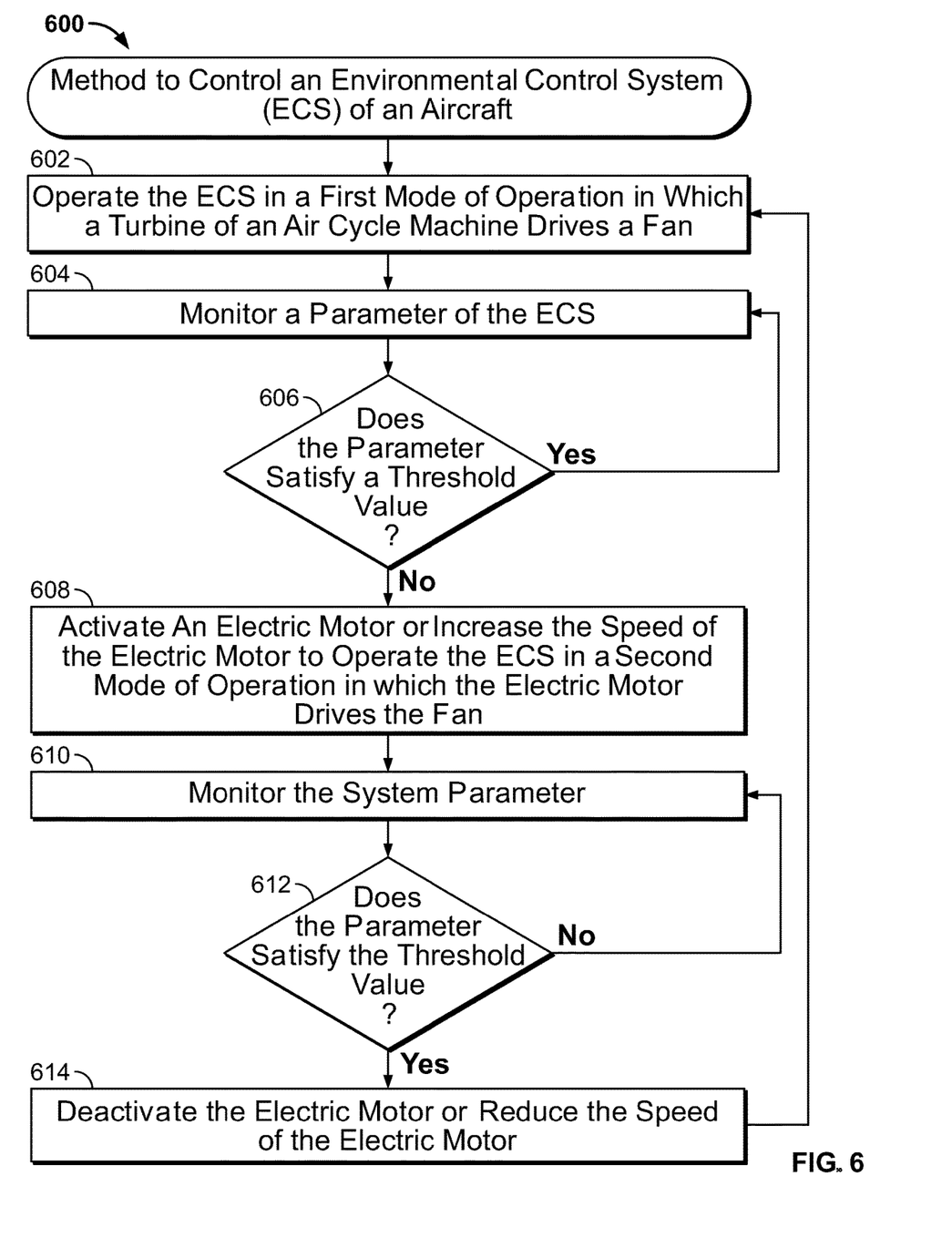
FIG. 6 is a flowchart representative of example machine readable instructions that may be implemented by an example control system of the example environmental control system of FIGS. 2 and/or 4.

A flowchart representative of example hardware logic, machine readable instructions, hardware implemented state machines, and/or any combination thereof for implementing the control system 280 of FIGS. 2 and 4 is shown in FIG. 6. The machine readable instructions may be one or more executable programs or portion(s) of an executable program for execution by a computer processor and/or processor circuitry, such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example control system 280 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, Fortran, etc.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of an example method 600 of controlling the ECS 200 that may be implemented by the control system 280. The method 600 can be implemented at least in part by machine readable instructions executed by the control system 280. The example method 600 is described in connection with the example ECS 200 of FIGS. 2 and 4. However, it is understood that the example method 600 could be similarly implemented in connection with other systems.

At block 602, the ECS 200 is operated in the first mode of operation in which the first and/or second turbines 214, 216 of the air cycle machine 202 drive(s) the fan 228 in the ram circuit 220. For example, during operation of the air cycle machine 202, the first and/or second turbines 214, 216 drive the first drive shaft 218, which drives the second drive shaft 230 via the overrunning clutch 278, thereby driving the fan 228. The first mode of operation may occur, for example, during take-off or cruise for the aircraft 100.

At block 604, the control system 280 monitors a parameter of the ECS. The parameter can include an air temperature value, an air pressure value, a water content value, a mass air flow rate, and/or any other measurable parameter. The control system 280 obtains the parameter from one or more signals from the sensor(s) 282 throughout the ECS 200 and/or the aircraft 100. In some examples, the control system 280 monitors multiple parameters.

At block 606, the comparator 284 of the control system 280 compares the parameter to a threshold value (or range) to determine if the parameter satisfies (e.g., is above, is below, etc.) the threshold value. For example, the comparator 284 can compare the parameter to a threshold value retrieved from a look-up table or storage or with the other values received by the sensors. In some examples, the parameter and/or the threshold value may be based on other operating conditions of the aircraft. If the system parameter satisfies the threshold value, controls proceeds back to block 604 and the control system 280 continues to monitor the system parameter.

If the parameter does not satisfy the threshold value, the electric motor controller 288, at block 608, activates the electric motor 276 or increases the speed of the electric motor 276 (if the electric motor 276 was already activated) to operate the ECS 200 in the second mode of operation in which the electric motor 276 drives the fan 228. As disclosed above, once the electric motor 276 drives the second drive shaft 230 faster than the speed of the first drive shaft 218, the overrunning clutch 278 decouples the first and second drive shafts 218, 230, thereby enabling the electric motor 276 to drive the fan 228 independent of the turbines 214, 216. The electric motor 276 can drive the fan 228 faster to meet the mass air flow demands through the ram circuit 220.

At block 610, the control system 280 continues to monitor the parameter. At block 612, the comparator 284 of the control system 280 compares the system parameter to the threshold value (or range) to determine if the parameter satisfies (e.g., is above, is below, etc.) the threshold value. If the parameter does not satisfy the threshold value, controls proceeds back to block 610 and the control system 280 continues to monitor the parameter. As such, the ECS 200 continues to operate in the second mode of operation where the electric motor 276 drives the fan 228.

If the parameter satisfies the threshold value, the electric motor controller 288, at block 614, deactivates the electric motor 276 or decreases the speed of the electric motor 276 (to operate the ECS 200 in the second mode of operation in which the electric motor 276 drives the fan 228. As disclosed above, once the second drive shaft 230 slows down to the same speed as the first drive shaft 218, the overrunning clutch 278 couples the first and second drive shafts 218, 230, thereby enabling the turbines 214, 216 of the air cycle machine 202 to drive the fan 228. Control proceeds back to block 602 and the example process repeats. The ECS 200 may switch back-and-forth between the first and second modes of operation to meet the cooling demands throughout the various ground and flight stages of the aircraft 100.

As an example of this process, assume the parameter includes the temperature and pressure of the outlet air 206. The temperature and pressure can be measured by the sensor(s) 282. The control system 280 monitors the temperature and pressure values of the outlet air 206 to ensure the temperature and pressure of the outlet air 206 are sufficient to properly pressurize and/or regulate the temperature of the cabin 104. The comparator 284 compares the measured temperature and pressure values to one or more thresholds. If the cooling system 270 is pumping fluid through the heat exchanger 274 and utilizing the ram air for cooling, the fan 228 may not produce sufficient mass air flow through the ram circuit 220 for meeting the demands of the primary and secondary heat exchangers 234, 236. As a result, the temperature and pressure values of the outlet air 206 may change (e.g., the temperature may increase and the pressure may decrease). If the comparator 284 determines the temperature and pressure values of the outlet air 206 fall outside of their acceptable thresholds, the electric motor controller 288 activates the electric motor 276 to drive the fan 228 at a faster speed to meet the mass air flow demands. The increased mass air flow through the ram circuit 220 helps meet the cooling demands of the heat exchangers 234, 236, 274. Once the demands are satisfied, the electric motor controller 288 may deactivate or reduce the speed of the electric motor 276 to enable the air cycle machine 202 to drive the fan again 228. This cycle may continue, thereby ensuring sufficient cooling is provided for both the air cycle machine 202 and for the cooling system 270.

As another example, the parameter can include a heat load from the cooling system 270. The heat load can represent the amount of cooling demand for the electronics bay 272. The head load can be provided by the sensor(s) 282 and/or by a signal from the cooling system 270. If the cooling system 270 is off or the heat load is low, the ECS 200 may continue to operate in the first mode of operation where the turbo-compressor 210 drives the fan 228. However, if the cooling system 270 is activated and/or the heat load is increased, the control system 280 can activate the electric motor 276 to first supplement the horsepower delivered by the turbine(s) 214, 216 and finally transitioning to drive the fan 228 in the second more of operation, thereby ensuring sufficient mass air flow is provided through the ram circuit 220. Once the heat load is reduced, the electric motor controller 288 deactivates or reduces the speed of the electric motor 276.

In other examples, other system parameters can be utilized to determine when to switch between the first and second modes of operation. Further, multiple system parameters can be combined and/or utilized to determine when to switch between the first and second modes of operations.

In some examples, the method 600 includes operating the ECS 200 in a third mode of operation in which the air cycle machine 202 and the electric motor 276 operate in conjunction to provide power to the fan 228. In the third mode of operation, the overrunning clutch 278 is engaged (coupling the first and second drive shafts 218, 230) and the electric motor 276 drives the second drive shaft 230 at the same speed as the first drive shaft 218 to supplement the power provided to the fan 228. For example, the sensor(s) 282 can include a speed sensor that detects the speed (e.g., revolutions-per-minute (RPMSs)) of the first drive shaft 218. The electric motor controller 288 activates the electric motor 276 to drive the second drive shaft 230 at the same speed as the first drive shaft 218. The overrunning clutch 278 is engaged and couples the first and second drive shaft 218, 230. As a result, the turbines 214, 216 provide some power to the fan 228, and the electric motor 276 provides some power to the fan 228. This reduces the load on the turbines 214, 216. In some examples, the ECS 200 is switched to the third mode of operation based on a comparison of one or more parameters and threshold(s), as disclosed above. Additionally or alternatively, the ECS 200 can be switched to the third mode of operation based on a command from a pilot.

In some examples, the method 600 includes activating the actuator 402 to move the variable inlet guide vanes 400. For example, when the ECS 200 is operating in the first mode of operation, the actuator controller 404 can activate the actuator 402 to move the variable inlet guide vanes 400 to a position (e.g., a partially closed position) that restricts or reduces air flow to the fan 228. This reduces the load on the turbines 214, 216 to drive the fan 228. When the ECS 200 is operating in the second mode of operation, the actuator controller 404 can activate the actuator 402 to move the variable inlet guide vanes 400 to a position (e.g., a fully open position) that allows more air flow to the fan 228.

Figure 7:
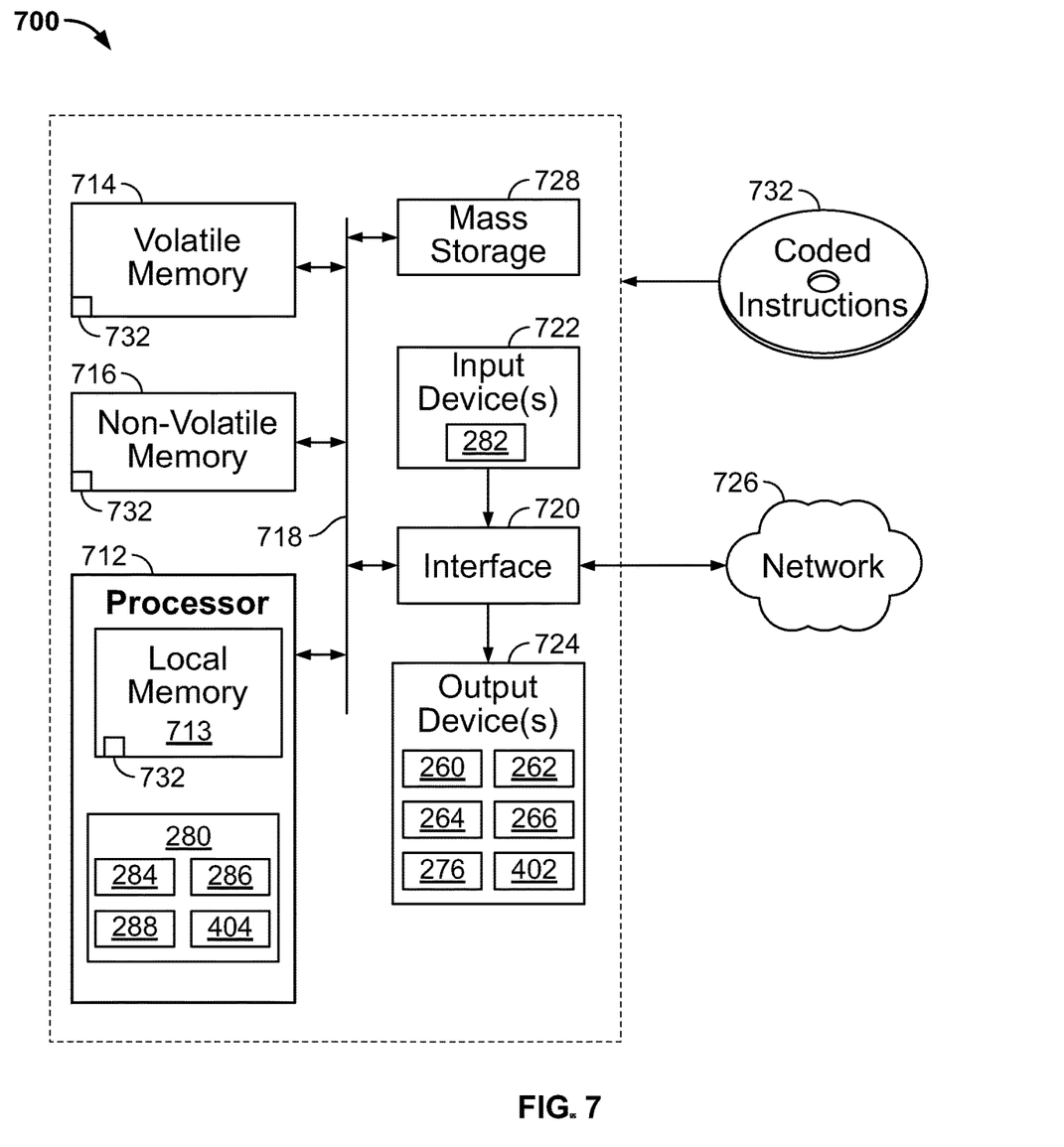
FIG. 7 is a block diagram of an example processing platform structured to execute the instructions of FIG. 6 to implement the example control system of the example environmental control system of FIGS. 2 and/or 4.

FIG. 7 is a block diagram of an example processor platform 700 structured to execute the instructions of FIG. 6 to implement the control system 280 of FIGS. 2 and 4. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor platform 700 implements the control system 280, including the comparator 284, the valve controller 286, the electric motor controller 288, and the actuator controller 404.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. In this example, the input device(s) 722 can include the sensor(s) 282. Additionally or alternatively, the input device(s) 722 can be implemented by, for example, an audio sensor, a microphone, a camera (still or video), a keyboard, a button, a mouse, a touchscreen, a track-pad, a trackball, isopoint and/or a voice recognition system.

One or more output device(s) 724 are also connected to the interface circuit 720 of the illustrated example. In this example, the output device(s) 724 can include the valves 260, 262, 264, 266, the electric motor 276, and/or the actuator 402. Additionally or alternatively, the output device(s) 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 6 may be stored in the mass storage device 728, in the volatile memory 714, in the non-volatile memory 716, and/or on a removable non-transitory computer readable storage medium such as a CD or DVD.

Example environmental control systems for aircraft have been disclosed herein. Examples and example combinations disclosed herein include:

From the foregoing, it will be appreciated that example methods, apparatus, and articles of manufacture have been disclosed that improve the cooling capabilities of an aircraft ECS ram circuit. As such, one or more additional heat exchangers from other cooling systems/loops in the aircraft can be installed in the ram circuit. This results in power and specific-fuel-consumption (SFC) savings to the aircraft.

Examples and example combinations disclosed herein include the following:

Example 1 is an environmental control system for an aircraft. The environmental control system includes an air cycle machine to produce cabin air for a cabin of the aircraft. The air cycle machine includes a turbine and a heat exchanger. The environmental control system includes a ram circuit. The heat exchanger is disposed in the ram circuit. The environmental control system also includes a fan in the ram circuit to control air flow through the ram circuit and across the heat exchanger, an electric motor, and an overrunning clutch operatively coupled between the turbine and the electric motor to enable the turbine to drive the fan during a first mode of operation and to enable the electric motor to drive the fan during a second mode of operation.

Example 2 includes the environmental control system of Example 1, wherein the turbine is coupled to and drives a first drive shaft. The environmental control system includes a second drive shaft coupled to the fan. The overrunning clutch is coupled between the first drive shaft and the second drive shaft.

Example 3 includes the environmental control system of Example 2, wherein the electric motor is coupled to the second drive shaft.

Example 4 includes the environmental control system of Example 3, wherein, during the first mode of operation, the overrunning clutch couples the first drive shaft and the second drive shaft to enable the turbine to drive the fan, and during the second mode of operation, the overrunning clutch decouples the first drive shaft and the second drive shaft to enable the electric motor to drive the second drive shaft independent of the first drive shaft.

Example 5 includes the environmental control system of Example 4, wherein, during a third mode of operation, the overrunning clutch couples the first drive shaft and the second drive shaft and the electric motor drives the second drive shaft at a same speed as the first drive shaft to supplemental power provided to the fan.

Example 6 includes the environmental control system of any of Examples 2-5, further including an air bearing to support the second drive shaft.

Example 7 includes the environmental control system of any of Examples 1-6, wherein the overrunning clutch is a sprag clutch.

Example 8 includes the environmental control system of any of Examples 1-7, wherein the heat exchanger is a first heat exchanger. The environmental control system further includes a second heat exchanger of a supplementary cooling system disposed in the ram circuit.

Example 9 includes the environmental control system of any of Examples 1-8, further including variable inlet guide vanes disposed in the ram circuit upstream of the fan.

Example 10 includes the environmental control system of Example 9, further including an actuator to move the variable inlet guide vanes to increase or decrease air flow to the fan.

Example 11 includes the environmental control system of Example 10, wherein, during the first mode of operation, the actuator is to move the variable inlet guide vanes to restrict air flow to the fan.

Example 12 includes the environmental control system of any of Examples 1-11, wherein the ram circuit is to direct atmospheric air across the heat exchanger.

Example 13 is a method including operating an environmental control system (ECS) of an aircraft in a first mode of operation in which a turbine of an air cycle machine of the ECS drives a fan disposed in a ram circuit of the ECS, monitoring a parameter of the ECS, comparing the parameter to a threshold, and, in response to determining the parameter does not satisfy the threshold, activating an electric motor to operate the ECS in a second mode of operation in which the electric motor drives the fan.

Example 14 includes the method of Example 13, further including, subsequent to activating the electric motor: monitoring the parameter, comparing the parameter to the threshold, and, in response to determining the parameter satisfies the threshold, deactivating the electric motor.

Example 15 includes the method of Examples 13 or 14, further including activating an actuator to move variable inlet guide vanes that are disposed upstream of the fan in the ram circuit.

Example 16 is an aircraft including an electronics bay including electronic components, a supplementary cooling system to regulate a temperature of the electronics bay, the supplementary cooling system including a heat exchanger, and an environmental control system (ECS) including a ram circuit, the heat exchanger of the supplementary cooling system disposed in the ram circuit.

Example 17 includes the aircraft of Example 16, wherein the ECS includes: an air cycle machine including a turbine, an electric motor, a fan in the ram circuit, and an overrunning clutch operatively coupled between the turbine and the electric motor to enable the turbine to drive the fan during a first mode of operation and to enable the electric motor to drive the fan during a second mode of operation.

Example 18 includes the aircraft of Example 17, wherein the overrunning clutch is a sprag clutch.

Example 19 includes the aircraft of Examples 17 or 18, wherein the heat exchanger is a first heat exchanger, and wherein air cycle machine includes a second heat exchanger disposed in the ram circuit.

Example 20 includes the aircraft of any of Examples 17-19, wherein ECS includes variable inlet guide vanes to control air flow to the fan.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An environmental control system for an aircraft, the environmental control system comprising:
   an air cycle machine to produce cabin air for a cabin of the aircraft, the air cycle machine including a turbine and a heat exchanger;
   a ram circuit, the heat exchanger disposed in the ram circuit;
   a fan in the ram circuit to control air flow through the ram circuit and across the heat exchanger;
   an electric motor; and
   an overrunning clutch operatively coupled between the turbine and the electric motor to couple the turbine to the fan to enable the turbine to drive the fan during a first mode of operation and to decouple the turbine from the fan to enable the electric motor to drive the fan independent of the turbine during a second mode of operation.

2. The environmental control system of claim 1, wherein the turbine is coupled to and drives a first drive shaft, the environmental control system including a second drive shaft coupled to the fan, the overrunning clutch coupled between the first drive shaft and the second drive shaft.

3. The environmental control system of claim 2, wherein the electric motor is coupled to the second drive shaft.

4. The environmental control system of claim 3, wherein, during the first mode of operation, the overrunning clutch couples the first drive shaft and the second drive shaft to enable the turbine to drive the fan, and during the second mode of operation, the overrunning clutch decouples the first drive shaft and the second drive shaft to enable the electric motor to drive the second drive shaft independent of the first drive shaft.

5. The environmental control system of claim 4, wherein, during a third mode of operation, the overrunning clutch couples the first drive shaft and the second drive shaft and the electric motor drives the second drive shaft at a same speed as the first drive shaft to supplement power provided to the fan.

6. The environmental control system of claim 2, further including an air bearing to support the second drive shaft.

7. The environmental control system of claim 1, wherein the overrunning clutch is a sprag clutch.

8. The environmental control system of claim 1, wherein the heat exchanger is a first heat exchanger, the environmental control system further including a second heat exchanger of a supplementary cooling system disposed in the ram circuit.

9. The environmental control system of claim 1, further including variable inlet guide vanes disposed in the ram circuit upstream of the fan.

10. The environmental control system of claim 9, further including an actuator to move the variable inlet guide vanes to increase or decrease air flow to the fan.

11. The environmental control system of claim 10, wherein, during the first mode of operation, the actuator is to move the variable inlet guide vanes to restrict air flow to the fan.

12. The environmental control system of claim 1, wherein the ram circuit is to direct atmospheric air across the heat exchanger.

13. A method comprising:
operating an environmental control system (ECS) of an aircraft in a first mode of operation in which a turbine of an air cycle machine of the ECS drives a fan disposed in a ram circuit of the ECS;
monitoring a parameter of the ECS;
comparing the parameter to a threshold; and
in response to determining the parameter does not satisfy the threshold, activating, by decoupling the fan from the turbine via an overrunning clutch, an electric motor to operate the ECS in a second mode of operation in which the electric motor drives the fan independent of the turbine, the ECS including:
the air cycle machine to produce cabin air for a cabin of the aircraft, the air cycle machine including the turbine and a heat exchanger;
the ram circuit, the heat exchanger disposed in the ram circuit;
the fan in the ram circuit to control air flow through the ram circuit and across the heat exchanger;
the electric motor; and
the overrunning clutch operatively coupled between the turbine and the electric motor to couple the turbine to the fan to enable the turbine to drive the fan during the first mode of operation and to decouple the turbine from the fan to enable the electric motor to drive the fan independent of the turbine during the second mode of operation.

14. The method of claim 13, further including, subsequent to activating the electric motor:
monitoring the parameter;
comparing the parameter to the threshold; and
in response to determining the parameter satisfies the threshold, deactivating the electric motor.

15. The method of claim 13, further including activating an actuator to move variable inlet guide vanes that are disposed upstream of the fan in the ram circuit.

16. An aircraft comprising:
an electronics bay including electronic components;
a supplementary cooling system to regulate a temperature of the electronics bay; and
an environmental control system (ECS) including:
an air cycle machine to produce cabin air for a cabin of the aircraft, the air cycle machine including a turbine and a heat exchanger;
a ram circuit, the heat exchanger disposed in the ram circuit;
a fan in the ram circuit to control air flow through the ram circuit and across the heat exchanger;
an electric motor; and
an overrunning clutch operatively coupled between the turbine and the electric motor to couple the turbine to the fan to enable the turbine to drive the fan during a first mode of operation and to decouple the turbine from the fan to enable the electric motor to drive the fan independent of the turbine during a second mode of operation.

17. The aircraft of claim 16, wherein the overrunning clutch is a sprag clutch.

18. The aircraft of claim 16, wherein the heat exchanger is a first heat exchanger, and wherein air cycle machine includes a second heat exchanger disposed in the supplementary cooling system.

19. The aircraft of claim 16, wherein ECS includes variable inlet guide vanes to control air flow to the fan.

20. The aircraft of claim 19, wherein the ECS includes an actuator to move the variable inlet guide vanes to increase or decrease air flow to the fan.

* * * * *